United States Patent

Speicher

[11] Patent Number: 5,936,766
[45] Date of Patent: Aug. 10, 1999

[54] DEVICE FOR SECURING ACCESSORY ITEMS TO A BINOCULAR

[76] Inventor: Brian L. Speicher, 1009 Matia Ct., N.E., Albuquerque, N.Mex. 87123

[21] Appl. No.: 09/060,235

[22] Filed: Apr. 14, 1998

[51] Int. Cl.[6] .............................. G02B 23/00; G02B 7/02
[52] U.S. Cl. .......................... 359/409; 359/407; 359/815
[58] Field of Search ........................ 359/399, 405–409, 359/430, 808–816, 819, 827; 206/316.3; 224/257, 269, 909; 248/177.1, 187.1, 316.5, 346.06, 902

[56] References Cited

U.S. PATENT DOCUMENTS

| | | | |
|---|---|---|---|
| 411,527 | 9/1889 | Meyrowitz | 359/409 |
| 2,316,164 | 4/1943 | Hoffeditz | 224/909 |
| 2,357,377 | 9/1944 | Bausch | 224/909 |
| 3,281,106 | 10/1966 | Bogdanovich | 248/314 |
| 3,787,021 | 1/1974 | Herst | 248/316.5 |
| 4,556,159 | 12/1985 | Swain | 224/257 |
| 4,557,451 | 12/1985 | Conway | 248/187.1 |
| 4,865,191 | 9/1989 | Easter | 206/316.3 |
| 5,221,991 | 6/1993 | Webster | 248/187.1 |
| 5,381,263 | 1/1995 | Nowak et al. | 359/409 |

*Primary Examiner*—Thong Nguyen
*Attorney, Agent, or Firm*—Kenneth L. Tolar

[57] ABSTRACT

A device removably attachable to a binocular allowing accessory items such as radios and cameras to be secured thereto. The device comprises a planar, substantially rectangular support platform having planar upper and lower surfaces and four peripheral edges. Hingedly attached to the lower surface of the support platform are a pair of arcuate walls for abutting and surrounding the binocular barrels. Integrally extending from an edge of each arcuate wall is a curved resilient finger for surrounding an opposing portion of a binocular barrel whereby the barrel may be secured therebetween. First and second straps depend from opposing edges of the support platform which may be wrapped around an accessory item and joined to secure the accessory item on the upper surface thereof. The retaining device may be further secured to a binocular using a pair of bands extending from opposing edges of the support platform which may be wrapped around the binocular and joined to secure the device thereto.

6 Claims, 1 Drawing Sheet

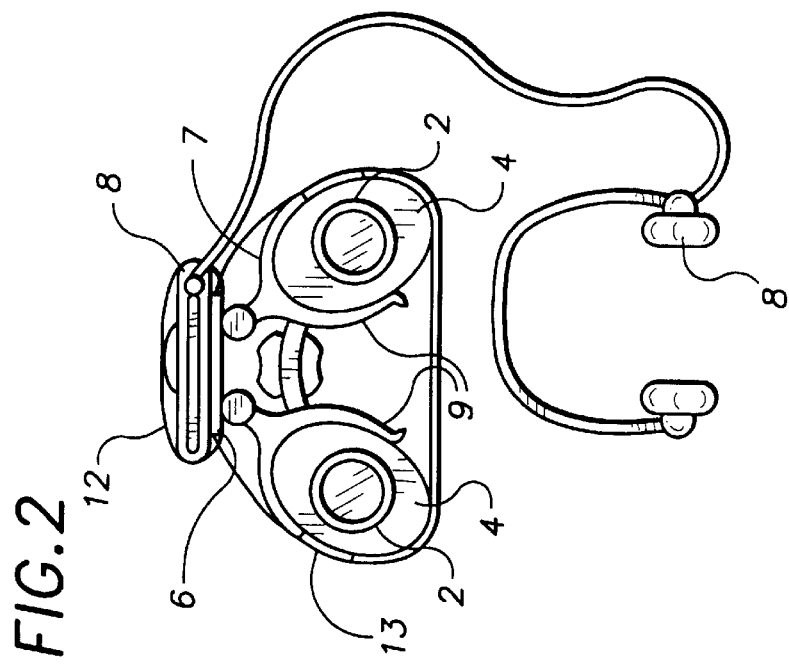
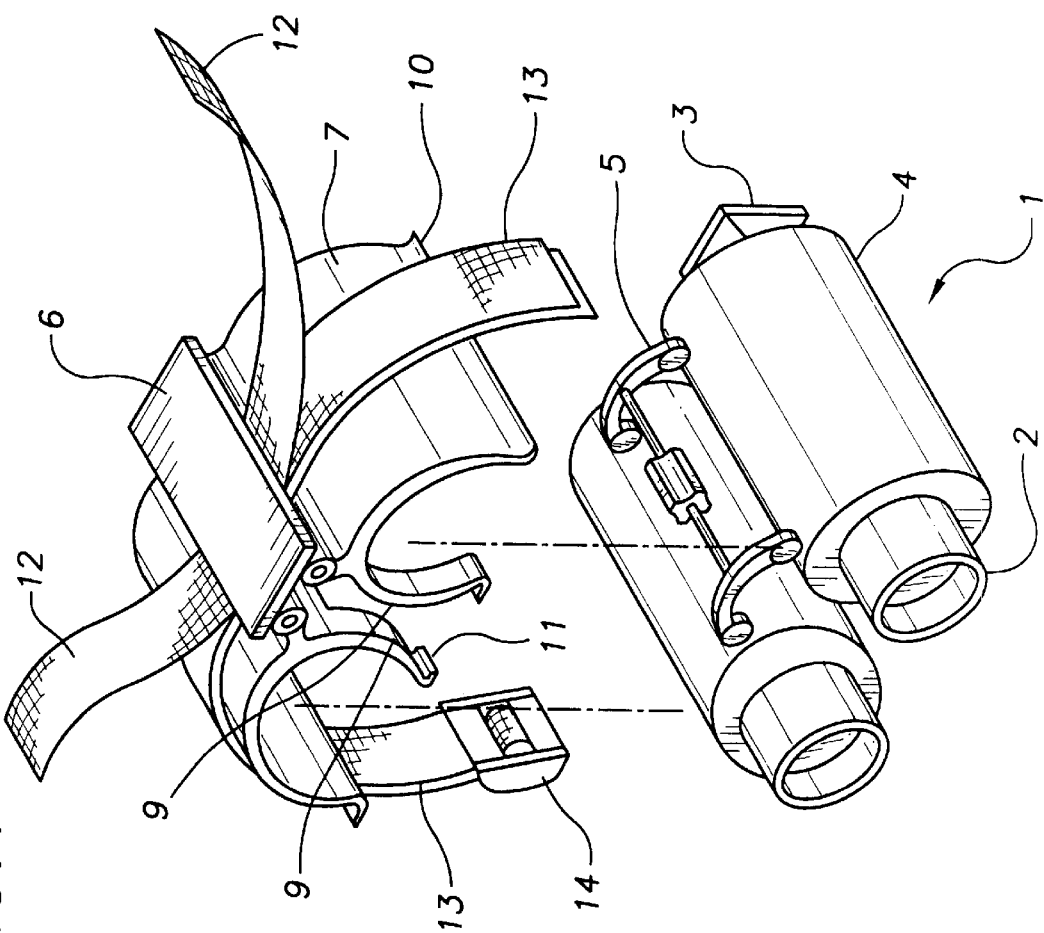

DEVICE FOR SECURING ACCESSORY ITEMS TO A BINOCULAR

BACKGROUND OF THE INVENTION

The present invention relates to a device attachable to a binocular allowing accessory items such as radios, cameras or sunglasses to be conveniently secured thereto.

DESCRIPTION OF THE PRIOR ART

A spectator often uses a binocular when viewing athletic contests, or when hunting, bird watching or participating in similar outdoor activities in which the spectator must observe the events from a considerable distance. While viewing or participating in such events, the spectator often uses additional items such as cameras, sunglasses or a radio. Such items, along with the binocular, are typically dangled around a person's neck which is cumbersome and awkward. Alternatively, the accessory items are held in one's hand preventing the hand from being used for other purposes. Accordingly, there is currently a need for a device which allows such accessory items to be conveniently secured to a binocular allowing them to be concurrently transported therewith.

Numerous devices have been heretofore designed for securing a binocular to support surfaces such as tripods and consoles. For example, U.S. Pat. No. 5,221,991 issued to Webster discloses a device for securing binoculars to a tripod. The device includes a rectangular base plate with a pad attached to the top side thereof A holding plate secures the central portion of a strap to the upper surface of the pad. The straps are inserted through openings on opposing edges of the base plate to secure the binoculars thereto. The bottom side of the base plate has a threaded opening for receiving a threaded bolt on a tripod.

U.S. Pat. No. 4,865,191 issued to Easter discloses a protective cover for optical instruments. The device includes a single expanse of flexible, waterproof material which surrounds the lens tubes and is securable therearound with straps.

U.S. Pat. No. 4,557,451 issued to Conway discloses a binocular support device including an elongated support member having straps for securing the binocular thereto and a mounting nut for attaching the support member to a tripod. The upper surface of the support surface is contoured to receive the binocular.

U.S. Pat. No. 4,556,159 issued to Swain discloses a binocular holder including an elastomeric holding band adapted to form a closed loop that grips the binoculars. The holding band includes a tensioning belt having terminal clips which attach to a user's shirt.

U.S. Pat. No. 3,787,021 issued to Herst relates to an adjustable carrier for retaining binoculars in automobiles and the like. The device comprises a horizontally disposed padded platform upon which the binocular lens rest. A pair of parallel posts vertically extend from the rear edge of the platform which are attached to a mounting bracket that clamps to the eye pieces of the binocular.

U.S. Pat. No. 3,281,106 issued to Bogdanovich discloses a device for securing a binocular upon a vessel comprising an open topped receptacle having a central member disposed between the binocular telescopes.

Each of the above described devices relate to protective covers or brackets for securing a binocular to an external mounting device such as a tripod, a vessel or an automobile. None of these devices are designed to secure small accessory items such as radios and cameras to a binocular. The present invention provides a device which may be quickly clipped to the exterior of a binocular to which small accessory items may be secured allowing the items to be conveniently and concurrently transported with the binocular.

SUMMARY OF THE INVENTION

The present invention relates to a device which may be easily attached to a binocular for securing accessory items thereto. The device comprises a substantially rectangular, planar support platform with a pair of straps attached to opposing edges thereof which surround an accessory item to secure it to the upper surface of the platform. Also extending from opposing edges of the support platform are a pair of bands which encompass the binocular and are selectively joined with a buckle to tightly secure the device thereto. Hingedly engaging the bottom surface of the support platform are a pair of opposing arcuate walls for abutting a portion of the binocular barrel. Depending from an edge of each wall is an arcuate finger for surrounding an opposing portion of the binocular barrel to clip the barrel therebetween. It is therefore an object of the present invention to provide a device for securing accessory items to a binocular that is easy to use and inexpensive to manufacture.

It is yet another object of the present invention to provide a device for securing accessory items to a binocular that cooperatively reciprocates with the binocular barrels.

It is yet another object of the present invention to provide a device for securing accessory items to a binocular which can quickly and securely retain items thereon. Other objects, features and advantages of the present invention will become readily apparent from the following detailed description of the preferred embodiment when considered with the attached drawings and the appended claims.

BRIEF DESCRIPTION OF THE DRAWINGS

FIG. 1 depicts the inventive device offset from a binocular and

FIG. 2 depicts the inventive device attached to a binocular with an accessory item secured thereto.

DESCRIPTION OF THE PREFERRED EMBODIMENT

Referring now to FIGS. 1 and 2, the present invention relates to a device for securing accessory items 8 to a binocular 1. A binocular 1 generally includes a pair of opposing elongated barrels 4 each having an eye piece 2 at one end and a lens 3 at the opposing end. The barrels 4 are typically interconnected with a hinge mechanism 5 so that the barrels may reciprocate to adapt to a particular user's eye spacing.

The present invention relates to a device attachable to a binocular 1 as described above. The device comprises a planar, substantially rectangular support platform 6. The support platform 6 has planar upper and lower surfaces and four peripheral edges. Hingedly attached to the lower surface of the support platform are a pair of opposing arcuate walls 7 dimensioned to engage and surround a portion of a binocular barrel. A distal edge of each wall has a flange 10 depending therefrom to assist a user in removing the device. Integrally depending from an opposing edge of each wall is an arcuate resilient finger 9 for retaining the wall against the barrel when the barrel is placed therebetween. Each finger also has an outwardly directed notch 11 allowing the finger to be grasped more easily when removing the device.

Accordingly, the device may be initially secured to a binocular by snapping each barrel between the finger and arcuate wall. The hingedly engaging arcuate walls allow the device to cooperatively reciprocate with the binocular barrels when attached thereto.

Attached to each of two opposing edges of the support platform is a strap 12 both of which are selectively joined to secure an accessory item to the upper surface thereof. The straps are preferably joined with a hook and loop fastener such as Velcro ®. Disposed immediately beneath each strap is a band 13 which may be extended to encompass the barrels and joined to the other strap using a buckle 14 to securely retain the device thereto.

The separable band is preferably made from nylon or a similar material. The buckle may be of any type generally known in the prior art. The remaining components of the device are preferably made with plastic. The strap and band may be joined with snaps or any other conventional fasteners. In addition, any suitable attachment means other than straps may be used to secure accessory items to the support platform. However, as will be readily apparent to those skilled in the art, the shape, size, materials of construction and arrangement of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a binocular having a pair of opposing, reciprocal barrels, a device for securing accessory items to the binocular comprising:

a planar support platform having an upper surface, a lower surface and at least two opposing peripheral edges;

a pair of opposing arcuate walls hingedly engaging the lower surface of said support platform, each for engaging a first portion of a designated one of said binocular barrels;

an arcuate resilient finger depending from an edge of each of said arcuate walls for surrounding and engaging an opposing portion of a designated one of said barrels to securely retain each one of said barrels between said finger and said wall;

means for securing an accessory item to the upper surface of said support platform.

2. A device according to claim 1 wherein said means for securing an accessory item to the upper surface of said support platform comprises a strap attached to each opposing edge of said support platform, said straps wrapped about the accessory item resting on the upper surface of said support platform and joined with a first fastener means to retain the item thereon.

3. A device according to claim 2 wherein said first fastener means is a hook and loop fastener.

4. A device according to claim 1 further comprising means for further securing the arcuate walls and support platform to a binocular.

5. A device according to claim 4 wherein said means for further securing the support platform and arcuate walls to a binocular comprises a band attached to each opposing edge of said support platform, said bands wrapped about the barrels of said binocular and joined with a second fastener means to secure the device thereto.

6. A device according to claim 5 wherein said second fastener means is a buckle.

\* \* \* \* \*